US012419394B1

(12) United States Patent
Gu

(10) Patent No.: US 12,419,394 B1
(45) Date of Patent: Sep. 23, 2025

(54) LIGHTING STRUCTURE AND WEARABLE DEVICE

(71) Applicant: SHENZHEN YOUWENNUAN TECHNOLOGY CO., LTD., Guangdong (CN)

(72) Inventor: Shuyuan Gu, Guangdong (CN)

(73) Assignee: SHENZHEN YOUWENNUAN TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 18/898,891

(22) Filed: Sep. 27, 2024

(30) Foreign Application Priority Data

Jul. 2, 2024 (CN) ........................ 202421537666.6

(51) Int. Cl.
*A44C 15/00* (2006.01)
*F21S 9/02* (2006.01)
*F21V 23/00* (2015.01)

(52) U.S. Cl.
CPC ............ *A44C 15/0015* (2013.01); *F21S 9/02* (2013.01); *F21V 23/003* (2013.01)

(58) Field of Classification Search
CPC ....... A44C 15/0015; F21S 9/02; F21V 23/003
See application file for complete search history.

(56) References Cited

U.S. PATENT DOCUMENTS

| | | | | |
|---|---|---|---|---|
| 9,078,495 | B2 * | 7/2015 | Rife | A44C 15/0015 |
| 11,184,971 | B1 * | 11/2021 | Rubin | H05B 47/198 |
| 12,156,715 | B2 * | 12/2024 | Hielscher | A61B 5/7235 |
| 2004/0065114 | A1 * | 4/2004 | Robertson | A44C 17/02 63/27 |
| 2012/0212938 | A1 * | 8/2012 | Nguyen | F21L 4/00 362/104 |
| 2013/0271964 | A1 * | 10/2013 | Rife | A45C 15/06 362/104 |
| 2019/0014872 | A1 * | 1/2019 | Finn | A44C 15/0045 |
| 2019/0069649 | A1 * | 3/2019 | Qin | F21V 23/001 |
| 2019/0098969 | A1 * | 4/2019 | Gibson | F21V 33/0008 |

* cited by examiner

*Primary Examiner* — Bryon T Gyllstrom
(74) *Attorney, Agent, or Firm* — HOWARD M COHN and Associates, LLC

(57) ABSTRACT

A lighting structure and a wearable device are provided. The lighting structure is provided, including at least one light source, a battery, and a control module. The at least one light source includes one or any combination of a first light-emitting diode (LED), a first electro-luminescent (EL) wire, a first optical fiber, and an organic light-emitting diode (OLED). The battery includes either a disposable battery or a rechargeable battery. The lighting structure includes the at least one light source and the battery, the at least one light source is configured as including a plurality of light-emitting materials or a single light-emitting material, and power supply modes of the lighting structure are also various, so that optimal lighting effect of the lighting structure is achieved.

18 Claims, 9 Drawing Sheets

LIGHTING STRUCTURE AND WEARABLE DEVICE

TECHNICAL FIELD

The present disclosure relates to a technical field of light-emitting diode (LED) light sources of wearable devices, and in particular to a lighting structure and a wearable device.

BACKGROUND

With the development of technology, light-emitting elements, such as light-emitting diodes (LEDs), are now widely applied in various scenarios and are also capable applying to various wearable objects, such as jewelry. When users use the jewelry provided with the light emitting elements, the lighting emitting elements are energized to light to enable more attractive appearance of the jewelry, thereby elevating sense of technology and fashion of the jewelry.

In the prior art, wearable devices, such as the jewelry capable of lighting, are single in functions. Typically, the wearable devices each is only provided with the light-emitting elements and a disposable battery, the users lack control over lighting of lighting-emitting elements, for example, when ambient light is high in intensity, lighting effect of the light-emitting elements is not prominent, which significantly reduces aesthetic appeal of the jewelry.

Therefore, the present disclosure provides a lighting structure being small in size and a wearable device incorporating the lighting structure to solve aforementioned problems.

Information disclosed in the background is only used to increase understanding of the background of the present disclosure, and therefore, it may include the prior art that is not known to those of ordinary skill in the art.

SUMMARY

The present disclosure aims to provide a lighting structure being small in size and a wearable device to solve problems currently appearing in the market proposed in the background.

In order to achieve above aims, the present disclosure provide following technical solutions.

The lighting structure is provided, including at least one light source, a battery, and a control module. The at least one light source includes one or any combination of a first light-emitting diode (LED), a first electro-luminescent (EL) wire, a first optical fiber, and an organic light-emitting diode (OLED). The battery includes either a disposable battery or a rechargeable battery. The control module includes a control chip and a controller, the controller is electrically connected to the control chip. The control chip is electrically connected to the at least one light source, the battery is electrically connected to the control chip and the controller.

A wearable device is further provided, including an ornament and the lighting structure as foregoing.

In some embodiments, the ornament includes one of a ring, a necklace, a bracelet, and an earring. The ornament defines mounting grooves, the at least one light source, the battery, and the control module are respectively mounted in the mounting grooves.

In some embodiments, the ornament includes the ring, the ring defines the mounting grooves, the at least one light source, the battery, and the control module are respectively mounted in the mounting grooves of the ring.

In some embodiments, the ornament includes the necklace, the necklace includes a chain band and a buckle portion, one end of the buckle portion is connected to the chain band. The necklace defines the mounting grooves, a first part of the mounting grooves is defined in the chain band, and a second part of the mounting grooves is defined in the buckle portion. The at least one light source is mounted in the first part of the mounting grooves, the battery and the control module are respectively mounted in the second part of the mounting grooves.

In some embodiments, the ornament includes the bracelet, a main body of the bracelet is composed of a second LED, a second EL wire, a second optical fiber, or a first OLED panel.

In some embodiments, the ornament includes the earring, a main body of the earring is composed of a third LED, a third EL wire, a third optical fiber, or a second OLED panel.

In some embodiments, the wearable device further includes a power supply module, the power supply module is disposed on the ornament and is electrically connected to the battery.

Compared with the prior art, beneficial effects of the present disclosure are as follows.

According to the present disclosure, the lighting structure includes the at least one light source and the battery, the at least one light source is configured as including a plurality of light-emitting materials or a single light-emitting material, and power supply modes of the lighting structure are also various, so that optimal lighting effect of the lighting structure is achieved. Moreover, the light structure is matched with the ornament, the ornament is capable of selecting from various jewelry, thereby enabling various appliance scenarios of the lighting structure and greatly enhancing aesthetic appeal of the ornament. Further, users may better control the wearable device provided with the lighting structure, the wearable device is convenient in control and is capable of achieving optimal lighting effect in various applicant scenarios, especially, when ambient light is relatively high in intensity, the wearable device is controlled to emit brighter light, thereby effectively enhancing lighting effect thereof.

The foregoing summary is for a purpose of description only and is not intended to be limiting in any way. In addition to illustrative aspects, embodiments, and features described above, further aspects, embodiments, and features of the present disclosure readily apparent by reference to accompanying drawings and following detailed description.

Figure 1:
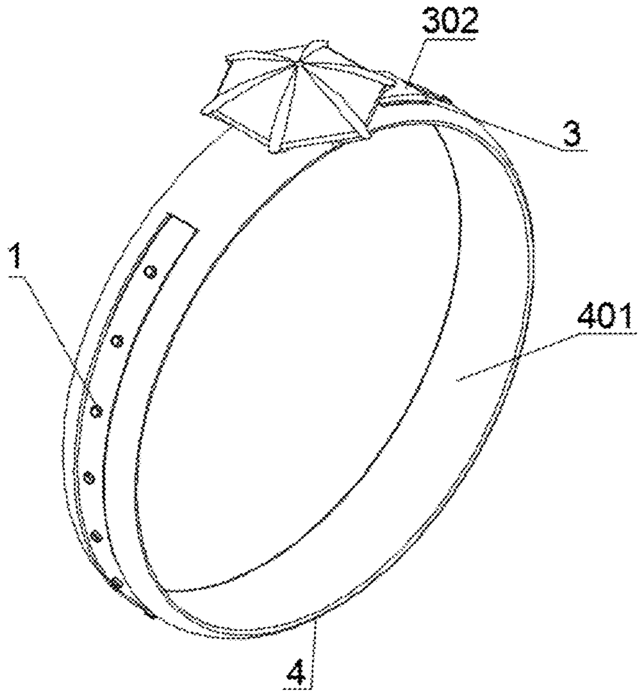
FIG. 1 is a first schematic diagram according to a first embodiment of the present disclosure.

Reference numerals in the drawings: 1. light source; 2. battery; 3. control module; 4. ornament; 5. power supply module; 301. control chip; 302. controller; 401. ring; 402. necklace; 403. bracelet; 404. earring; 4021. chain band; 4022. buckle portion.

DETAILED DESCRIPTION OF EMBODIMENTS

Technical solutions in embodiments of the present disclosure are clearly and completely described below with reference to accompanying drawings in the embodiments of the present disclosure. Apparently, the described embodiments are only a part but not all of the embodiments of the present disclosure. It is to be noted that the accompanying drawings are schematic and are not to scale. For clarity and convenience in the drawings, relative sizes and proportions of parts shown in the accompanying drawings are exaggerated or reduced in size, and any size of the parts shown in the accompany drawings is merely exemplary and is not intended to be limiting.

First Embodiment

Figure 2:
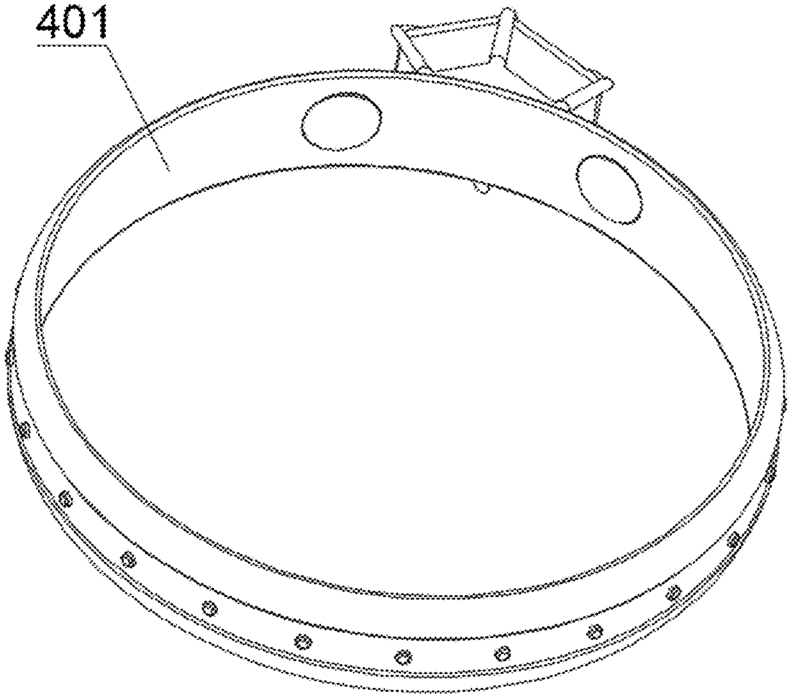
FIG. 2 is a second schematic diagram according to the first embodiment of the present disclosure.
Figure 3:
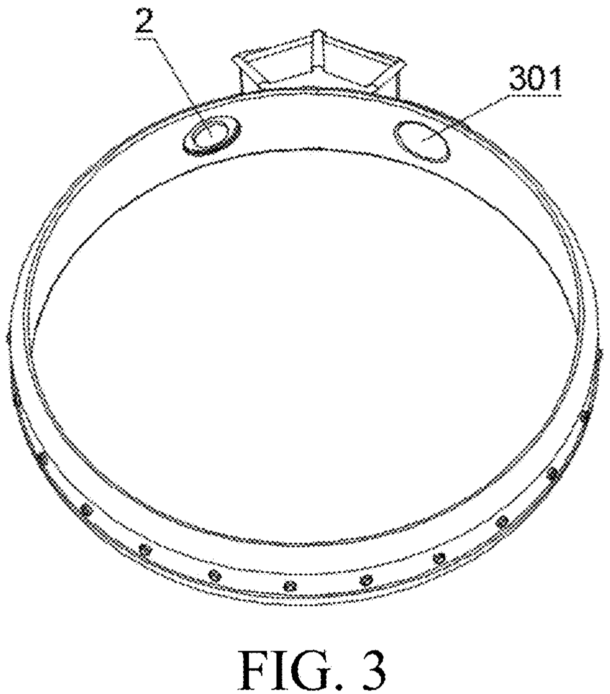
FIG. 3 is an assembly schematic diagram according to the first embodiment of the present disclosure.
Figure 4:
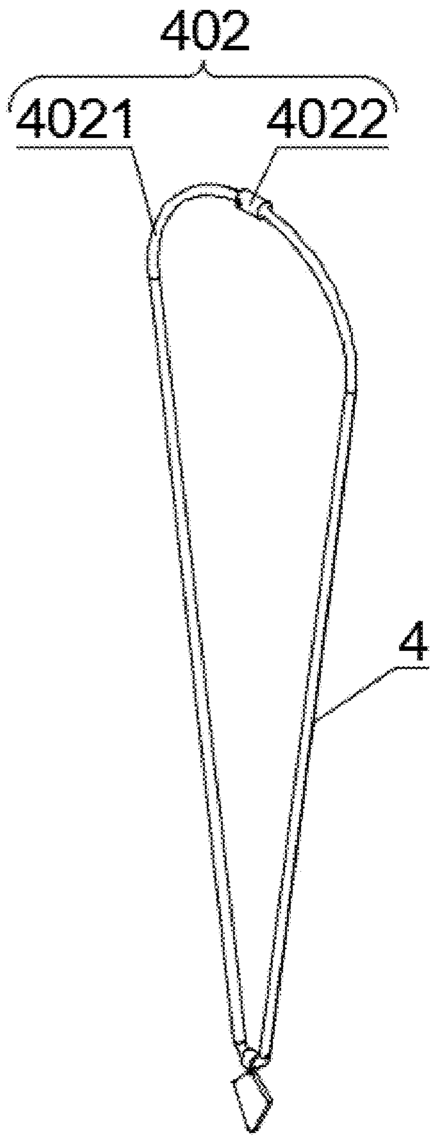
FIG. 4 is a schematic diagram according to a second embodiment of the present disclosure.
Figure 5:
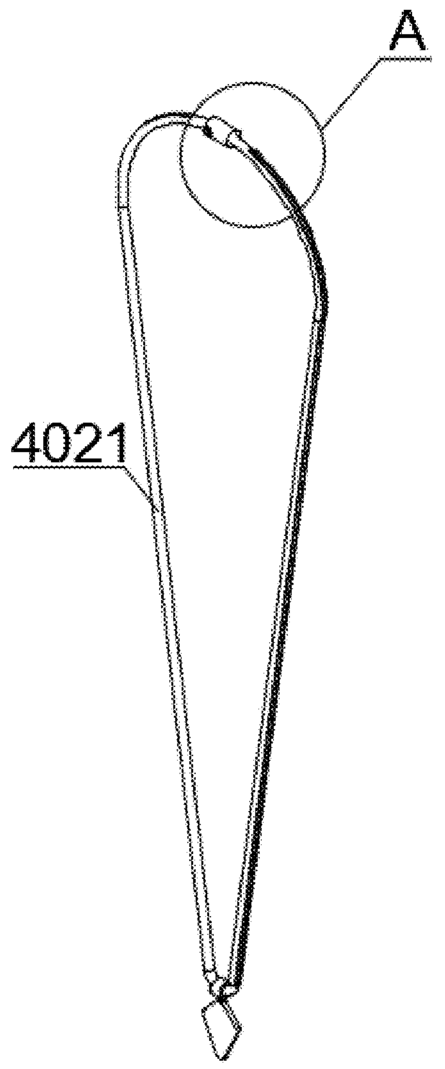
FIG. 5 is an assembly schematic diagram of a light source according to the second embodiment of the present disclosure.
Figure 6:
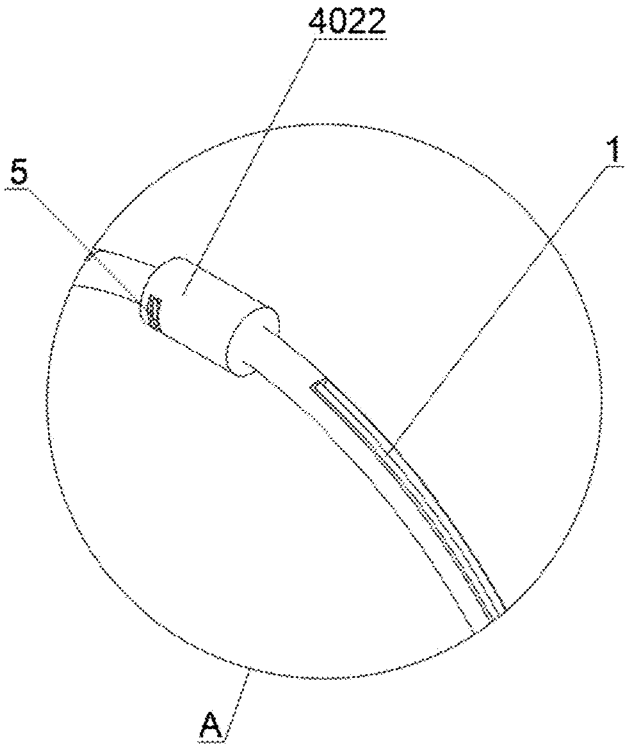
FIG. 6 is an enlarged structural schematic diagram of portion A shown in FIG. 5.
Figure 7:
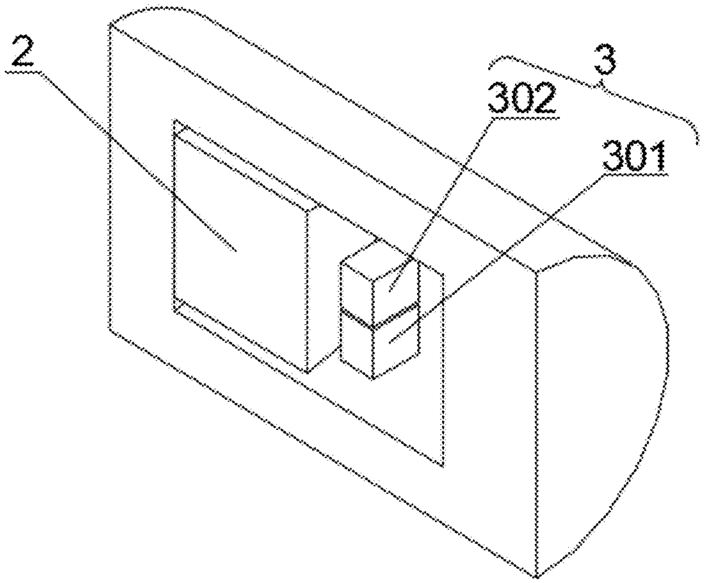
FIG. 7 is a structural schematic diagram of a buckle portion according to the second embodiment of the present disclosure.

Please refer to FIGS. 1-3, a lighting structure being small in size and a wearable device are provided.

The lighting structure includes at least one light source 1, a battery 2, and a control module 3. The control module 3 includes a control chip 301 and a controller 302, the controller 302 is electrically connected to the control chip 301. The controller 302 is a touch sensor, the control chip 301 is electrically connected to the at least one light source 1, the at least one light source is a first light-emitting diode (LED), the battery 2 is a disposable battery, and the battery 2 is electrically connected to the control chip 301 and the controller 302.

The wearable device includes an ornament 4, the ornament 4 includes a ring 401, the ring 401 defines mounting grooves, the at least one light source 1, the controller 302, the battery 2, and the control chip 301 are respectively mounted in the mounting grooves of the ring 401

Second Embodiment

Please refer to FIGS. 4-7, the lighting structure being small in the size and the wearable device are provided.

The lighting structure includes the at least one light source 1, the battery 2, and the control module 3. The at least one light source 1 is the first LED, the battery 2 is a rechargeable battery. The control module 3 includes the control chip 301 and the controller 302, the controller 302 is electrically connected to the control chip 301. The controller 302 is a communication chip for external communication, the control chip 301 is electrically connected to the at least one light source 1, the controller 302 is configured to input a received signal into the control chip 301 to control lighting of the at least one light source 1, and the battery 2 is electrically connected to the control chip 301 and the controller 302.

The wearable device includes the ornament 4, the ornament 4 is a necklace 402, the necklace 402 includes a chain band 4021 and a buckle portion 4022, one end of the buckle portion 4022 is connected to the chain band 4021. The necklace 402 defines the mounting grooves, a first part of the mounting grooves is defined in the chain band 4021, and a second part of the mounting grooves is defined in the buckle portion 4022. The at least one light source 1 is mounted in the first part of the mounting grooves, the battery 2 and the control module are respectively mounted in the second part of the mounting grooves. The wearable device further includes a power supply module 5, the power supply module 5 is a common charging device in the prior art, such as a USB or a wireless charging device. The power supply module 5 is disposed on the buckle portion 4022 of the necklace 402 and is electrically connected to the battery 2.

Third Embodiment

Figure 8:
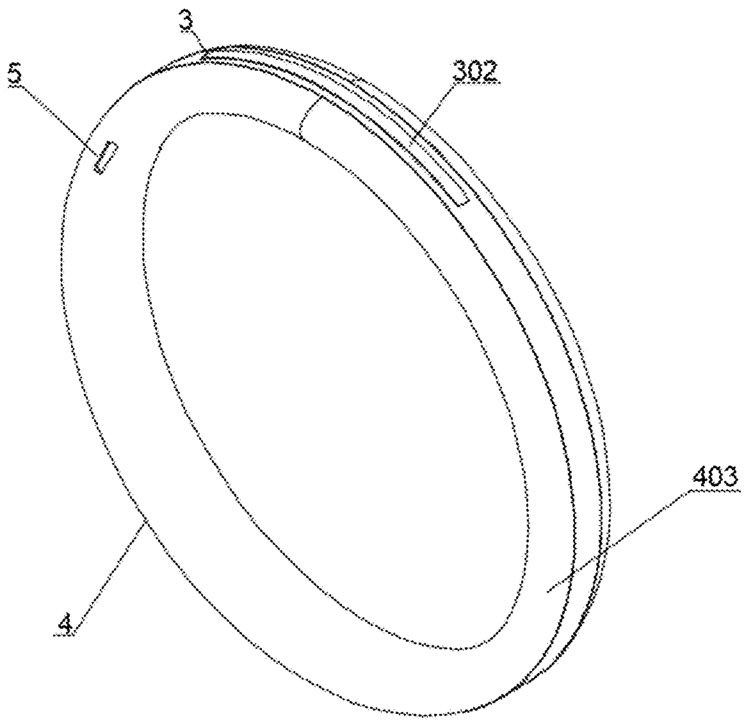
FIG. 8 is a schematic diagram according to a third embodiment of the present disclosure.
Figure 9:
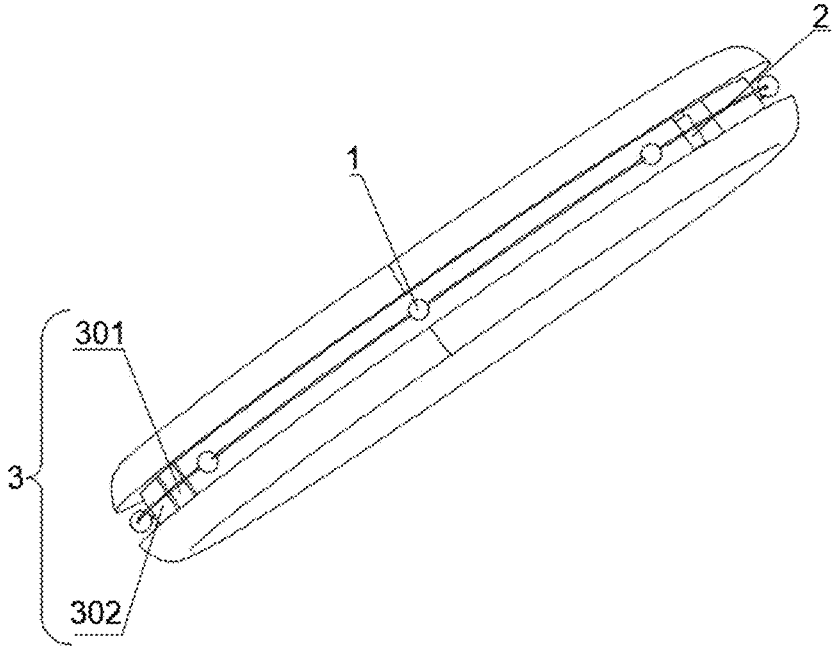
FIG. 9 is an assembly schematic diagram of the light source, the battery, and the control module according to the third embodiment of the present disclosure.

Please refer to FIGS. 8-9, the lighting structure being small in the size and the wearable device are provided.

The lighting structure includes the at least one light source 1, the battery 2, and the control module 3. The control module 3 includes the control chip 301 and the controller 302, the controller 302 is electrically connected to the control chip 301. The controller 302 is the touch sensor, the control chip 301 is electrically connected to the at least one light source 1, the at least one light source is the first LED, the battery 2 is the rechargeable battery, and the battery 2 is electrically connected to the control chip 301 and the controller 302.

The wearable device includes the ornament 4, the ornament 4 is a bracelet 403, a main body of the bracelet 403 is composed of a second LED, a second electro-luminescent (EL) wire, a second optical fiber, and a first organic light-emitting diode (OLED) panel. The bracelet 403 defines the mounting grooves, the at least one light source 1 and the controller 302 are mounted in a first part of the mounting grooves. The wearable device further includes the power supply module 5, the power supply module 5 is the common charging device in the prior art, such as the USB or the wireless charging device. The power supply module 5 is disposed in a second part of the mounting grooves of the bracelet 403 and is electrically connected to the battery 2.

Fourth Embodiment

Figure 10:
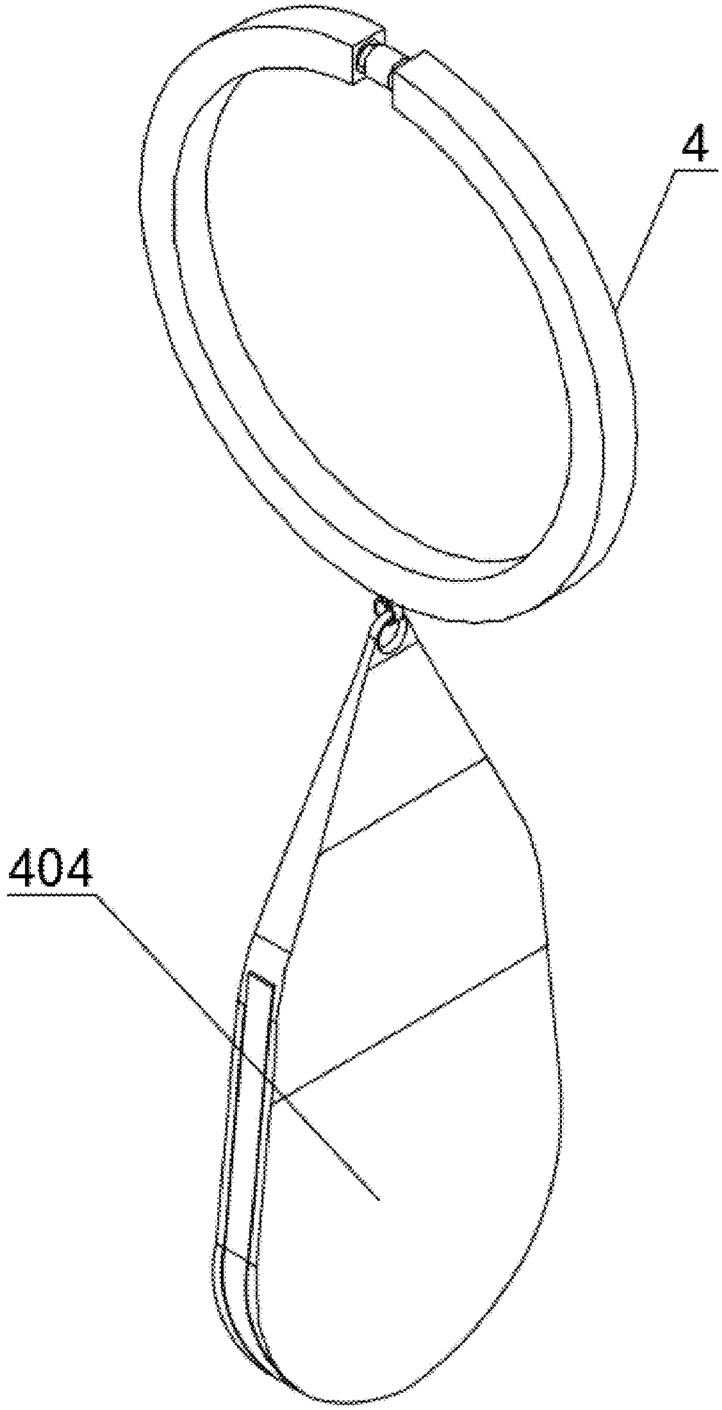
FIG. 10 is a schematic diagram according to a fourth embodiment of the present disclosure.
Figure 11:
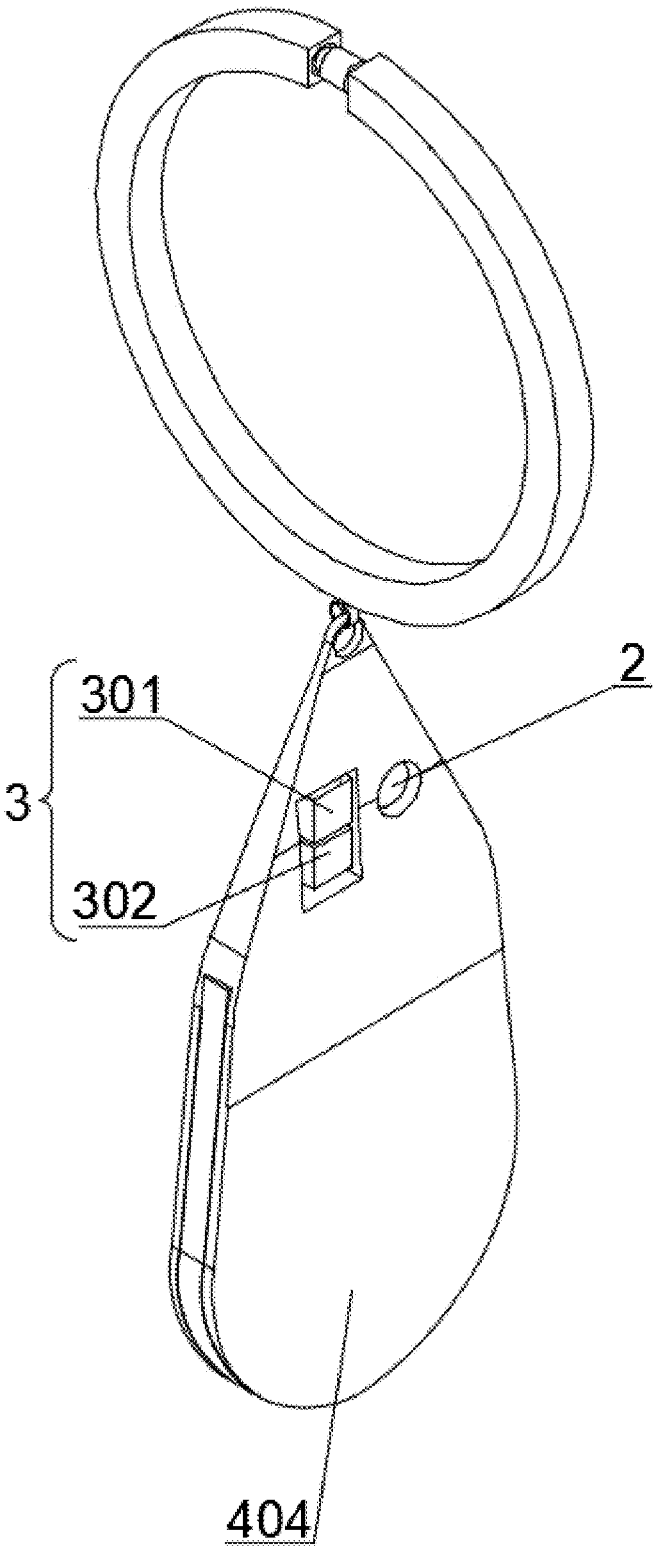
FIG. 11 is an assembly schematic diagram of the light source, the battery, and the control module according to the fourth embodiment of the present disclosure.
Figure 12:
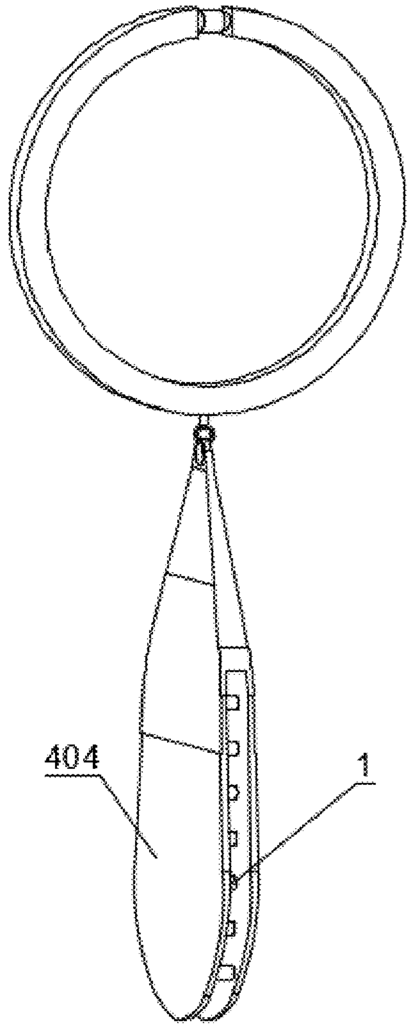
FIG. 12 is a side schematic diagram of FIG. 11.

Please refer to FIGS. 10-12, the lighting structure being small in the size and the wearable device are provided.

The lighting structure includes the at least one light source 1, the battery 2, and the control module 3. The control module 3 includes the control chip 301 and the controller 302, the controller 302 is electrically connected to the control chip 301. The at least one light source 1 is the first LED, the battery 2 is the rechargeable battery, and the controller 302 is the communication chip utilizing communication methods in the prior art, such as Wi-Fi and Bluetooth to achieve control. The battery 2 is electrically connected to the control chip 301 and the controller 302.

The wearable device includes the ornament 4, the ornament 4 is an earring 404, a main body of the earring 404 is composed of a third LED, a third EL wire, a third optical fiber, and a second OLED panel. The earring 404 defines the mounting grooves. The at least one light source 1 is mounted in a first part of the mounting grooves, where the first part of the mounting grooves is defined in the earring 404; the battery and the control module 3 are mounted in a second part of the mounting grooves, where the second part of the mounting grooves includes different mounting grooves defined on a side surface of the earring 404. The wearable device further includes the power supply module 5, the power supply module 5 is the common charging device in the prior art, such as the USB or the wireless charging device. The power supply module 5 is electrically connected to the battery 2.

Furthermore, in addition to the first LED, in other embodiments, the at least one light source 1 is selected from a first EL wire, a first optical fiber, and an OLED, as well as from an EL film, a laser diode, quantum dots, nanoluminescent materials, all of which have the same lighting effect.

In addition to the ornament as foregoing, the ornament is further selected from a metal bracelets, a leather bracelet, a bead bracelet, a stud earring, a dangle earring, a clip-on earring, an ankle bracelet, a brooch, belt, watches, and glass, etc., structures of which are similar to the ornament as foregoing and have the same principle.

Specifically, in addition to the aforementioned embodiments, the control module 3 further has other control modes, such as manual control (directly performing control operations through physical devices, such as switches or knobs), automatic control (performing the control operations through automation equipment, such as sensors, timers, programmable logic controllers (PLCs), etc.), remote control (performing the control operations through remote controls, radio signals, infrared signals, or other remote control devices), computer control (performing the control operations through computers, embedded systems, and associated software thereof), feedback control (performing the control operations, automatically adjusting and optimizing the control operations through feedback systems, such as proportional-integral-derivative (PID) controllers), voice control (performing the control operations through voice recognition technology), smart device control (performing the control operations through applications on smartphones, tablets, or other mobile devices), Internet of Things (IoT) control (performing remote and automatic control operations through IoT devices and platforms), artificial intelligence (AI) control (performing intelligent control operations through machine learning, AI algorithms, and related hardware).

All standard parts used in the present disclosure may be purchased from the market, and special-shaped parts may be customized according to the specification and drawings, and specific connection modes of parts are conventional means, such as bolts, rivets, welding, etc., in the prior art, and the machinery, the parts, and equipment are all conventional models in the prior art, and circuit connection in the present disclosure adopts a conventional connection mode in the prior art, which are be described in detail herein. Contents not described in detail in the specification are all prior arts commonly known to those who skilled in the art.

In the description of the present disclosure, terms "first" and "second" are used for descriptive purposes only and cannot be understood as indicating or implying relative importance or implicitly indicating a number of indicated technical features. Thus, features defined with "first" and "second" may explicitly or implicitly include one or more of the features. A term "a plurality of" means two or more, unless specifically defined otherwise.

In the present disclosure, unless otherwise specified and limited, terms, such as "disposed", "connected with", "connected to", and "fixed" should be understood in a broad sense, for example, may be a fixed connection, a detachable connection, or a whole; may be a mechanical connection, or may be an electrical connection; or may be a direct connection, or may be indirectly connected by using an intermediate medium, and may be communication between interiors of two elements or an interaction relationship of the two elements. For those who skilled in the art, specific meanings of the above terms in the present disclosure may be understood according to specific situations.

In the present disclosure, unless otherwise specified and limited, term "on" or "below" referring to a relationship between a first feature and a second feature means that the first feature is directly in contact with the second feature, or the first feature and the second feature are indirectly connected through the intermediate medium. Moreover, when the first feature is described as being "above", "on top of", or "over" the second feature, it may mean that the first feature is directly above or diagonally above the second feature, or simply that a horizontal height of the first feature is higher than that of the second feature. When the first feature is described as being "below", "underneath", or "beneath" the second feature, it may mean that the first feature is directly below or diagonally below the second feature, or simply that the horizontal height of the first feature is lower than that of the second feature.

In the description of the specification, references to terms, such as "one embodiment", "some embodiments", "example", "specific example", or "some examples" indicate that specific features, structures, materials, or characteristics described in connection with the embodiment or example are included in at least one embodiment or example of the present disclosure. In the specification, illustrative use of such terms does not necessarily refer to the same embodiment or example. Furthermore, the specific features, structures, materials, or characteristics described may be combined in any suitable manner in any one or more embodiments or examples. Additionally, those who skilled in the art may combine and integrate the features of different embodiments or examples described in the specification, without mutual contradiction.

In the accompanying drawings of the embodiments of the present disclosure, only structures involved in the aforementioned embodiments are shown. Other structures may be referred to as per conventional designs. Where there is no conflict, the embodiments of the present disclosure may be combined among themselves and with different embodiments.

Although the present disclosure has been described in detail with reference to the aforementioned embodiments, those who skilled in the art may still modify the technical solutions described in the embodiments or make equivalent substitutions for some of the technical features. Any modifications, equivalent replacements, improvements, etc., made within spirit and principles of the present disclosure should be included within a protection scope of the present disclosure.

What is claimed is:

1. A wearable device, comprising:

an ornament; and a lighting structure, comprising:

at least one light source;

a battery; and a control module;

wherein the at least one light source comprises one or any combination of a first light-emitting diode (LED), a first electro-luminescent (EL) wire, a first optical fiber, and an organic light-emitting diode (OLED);

the battery comprises either a disposable battery or a rechargeable battery;

the control module comprises a control chip and a controller, the controller is electrically connected to the control chip; and the control chip is electrically connected to the at least one light source, the battery is electrically connected to the control chip and the controller; and a lateral side surface the ornament defines a plurality of separate mounting grooves, the at least one light source, the battery, and the control module are respectively installed in the separate mounting grooves.

2. The wearable device according to claim 1, wherein the ornament comprises a necklace, the necklace comprises a chain band and a buckle portion, one end of the buckle portion is connected to the chain band;

the necklace defines the mounting grooves, a first part of the mounting grooves is defined in the chain band, and a second part of the mounting grooves is defined in the buckle portion; and the at least one light source is mounted in the first part of the mounting grooves, the battery and the control module are respectively mounted in the second part of the mounting grooves.

3. The wearable device according to claim 1, wherein the ornament comprises the bracelet, a main body of the bracelet is composed of a second LED, a second EL wire, a second optical fiber, or a first OLED panel.

4. The wearable device according to claim 1, wherein the ornament comprises the earring, a main body of the earring is composed of a third LED, a third EL wire, a third optical fiber, or a second OLED panel.

5. The wearable device according to claim 1, wherein the wearable device further comprises a power supply module, the power supply module is disposed on the ornament and is electrically connected to the battery.

6. The wearable device according to claim 1, wherein the controller is exposed out of the mounting groove for installing the control chip, the controller enables manual adjustment of brightness or remote dynamic control to optimize the lighting effects of the light source.

7. A wearable device, comprising:

an ornament; and a lighting structure, comprising:

at least one light source;

a control module, the control module comprises a control chip and a controller, the controller is electrically connected to the control chip, the control chip is electrically connected to the at least one light source; and a lateral side surface the ornament defines a plurality of separate mounting grooves, the at least one light source, and the control chip are respectively installed in the separate mounting grooves, and the controller is exposed out of the mounting groove for installing the control chip, the controller enables manual adjustment of brightness or remote dynamic control to optimize the lighting effects of the light source.

8. The wearable device according to claim 7, wherein the lighting structure further comprises a battery, the battery is electrically connected to the control chip and the controller.

9. The wearable device according to claim 8, wherein the battery is installed in the mounting groove for installing the control chip.

10. The wearable device according to claim 8, wherein the battery is installed in the mounting groove for installing the light source.

11. The wearable device according to claim 8, wherein the battery is installed in a separate mounting groove different from the mounting grooves for installing the light source and the control chip.

12. The wearable device according to claim 11, wherein the wearable device further comprises a power supply module disposed on the buckle portion, the power supply module is a USB or a wireless charging device, and the power supply module is electrically connected to the battery.

13. The wearable device according to claim 8, wherein the ornament comprises a necklace, the necklace comprises a chain band and a buckle portion, one end of the buckle portion is connected to the chain band;

the necklace defines the mounting grooves, a first part of the mounting grooves is defined in the chain band, and a second part of the mounting grooves is defined in the buckle portion; and the at least one light source is mounted in the first part of the mounting grooves, the battery and the control module are respectively mounted in the second part of the mounting grooves.

14. The wearable device according to claim 8, wherein the wearable device further comprises a power supply module, the power supply module is a USB or a wireless charging device, and the power supply module is electrically connected to the battery.

15. The wearable device according to claim 8, wherein the ornament comprises an earring, the separate mounting grooves are defined on the main body of the earring, the at least one light source is mounted in a first part of the mounting grooves, the battery and the control module are mounted in a second part of the mounting grooves, where the second part of the mounting grooves comprises different mounting grooves defined on a side surface of the earring.

16. The wearable device according to claim 8, wherein the battery is a rechargeable battery.

17. The wearable device according to claim 7, wherein the ornament comprises a ring, the ring defines the separate mounting grooves.

18. The wearable device according to claim 7, wherein the ornament comprises a bracelet, the separate mounting grooves are defined on a main body of the bracelet.

* * * * *